Nov. 8, 1927.

H. B. SCOTT ET AL 1,648,328

GRAINING PLATE FILLER AND STRIKER

Filed Aug. 21, 1925    6 Sheets-Sheet 5

Inventors
Howard B. Scott,
Joseph C. Widmont
and Henry Huey

By Carl Benst
Henry C. Stauffer
their Attorneys

Nov. 8, 1927.  1,648,328

H. B. SCOTT ET AL

GRAINING PLATE FILLER AND STRIKER

Filed Aug. 21, 1925   6 Sheets-Sheet 6

Inventors
Howard B. Scott,
Joseph C. Widmont
and Henry Huey
By Carl Beust
Henry E. Stauffer
their Attorneys Patented Nov. 8, 1927.

1,648,328

UNITED STATES PATENT OFFICE.

HOWARD B. SCOTT, JOSEPH C. WIDMONT, AND HENRY HUEY, OF DAYTON, OHIO, ASSIGNORS, BY MESNE ASSIGNMENTS, TO THE NATIONAL CASH REGISTER COMPANY, OF DAYTON, OHIO, A CORPORATION OF MARYLAND.

GRAINING-PLATE FILLER AND STRIKER.

Application filed August 21, 1925. Serial No. 51,718.

This invention relates to devices for filling and striking or wiping engraved or etched plates mechanically.

The principal object of this invention is to provide a device which will mechanically fill and wipe an engraved surface.

Another object is to provide such a machine with an automatic stop mechanism which is effective at the end of the operation of said device.

Another object is to provide means for automatically raising and lowering the spreader and the striker at the correct time.

Another object is to construct the machine so that the striker will move a short distance laterally on each operation to make the wear on the plate more uniform.

Still another object is the provision of means for preventing the settling of the pigment in its receptacle between operations.

With these and incidental objects in view, the invention consists of certain novel features of construction and combinations of parts, the essential elements of which are set forth in appended claims and a preferred form of embodiment of which is hereinafter described with reference to the drawings which accompany and form part of this specification.

*General description.*

The present invention is adapted, in the embodiment shown herein, for use in the process of applying a wood grain to metal parts, such as cabinets for cash registers, adding machines, filing cabinets, etc.

The graining process will be briefly described herein. A photograph of the desired wood grain is made, and is transferred to a flat copper plate by the well known photo-engraving process. The plate is then evenly spread with a graining paste or pigment, and the surface is wiped to remove the surplus, leaving the paste in the depressions of the plate. A roller made, of any suitable material, preferably of a combination of gelatin and glue, is then passed over the plate. The paste will be taken up on the roller, and when the roller is subsequently passed over the work to be grained, the paste will be deposited thereon, making an exact reproduction of the wood grain.

Applicants' invention has greatly increased the speed with which this work can be done. The master plate is secured on a table and a combination filler and striker is mounted to slide above it. The paste is normally contained in a receptacle at one end of the table, and is kept constantly agitated by a set of revolving gears.

When the plate is to be filled, the operator trips a latch with his foot, which connects the filler carriage with a continuously driven driving mechanism. The filler then moves the length of the table, spreading the paste evenly over the surface of the plate. When the filler starts back to its normal position, a device is automatically actuated, which rocks the filler upward and out of contact with the plate, and which, at the same time, moves the striker down into contact with said plate. When, therefore, the mechanism moves back to its starting point, the striker wipes the plate clean, except, of course, that portion of the paste which is in the holes or depressions in said plate.

The impression rollers may then be passed over the plate to transfer the grain to said rollers. As soon as the operator passes a transfer roller over the plate, he will trip the releasing latch with his foot and the machine will at once operate to again fill and wipe the master plate, so that it is ready for the next operation.

Supporting table.

Figure 2:
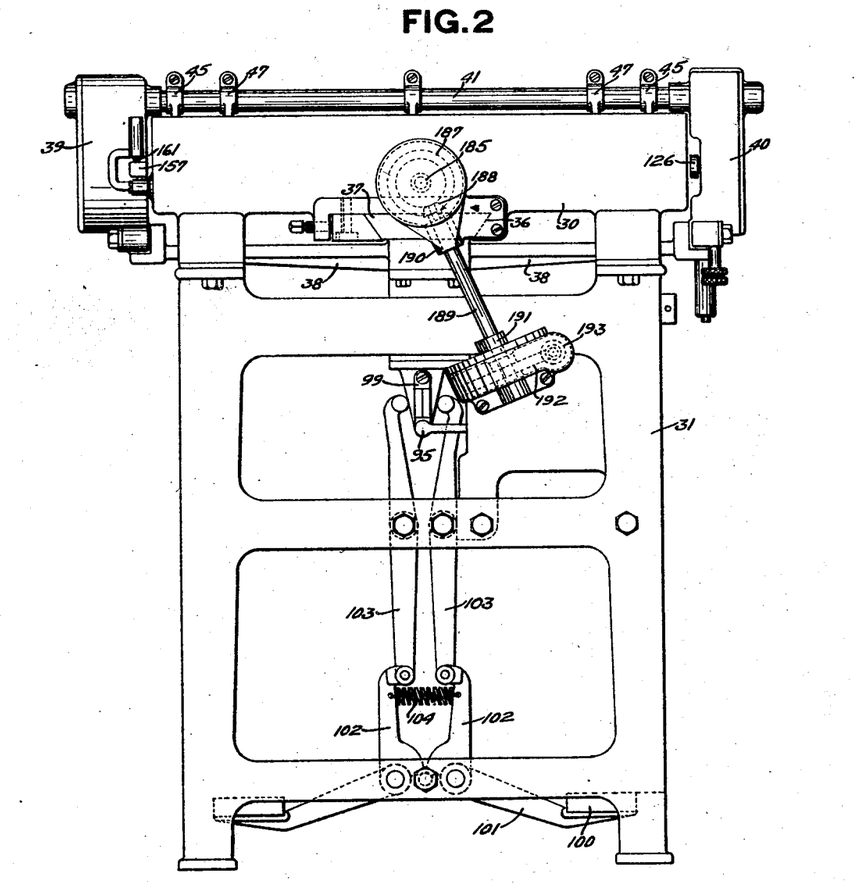
Fig. 2 is an end of the machine.
Figure 3:
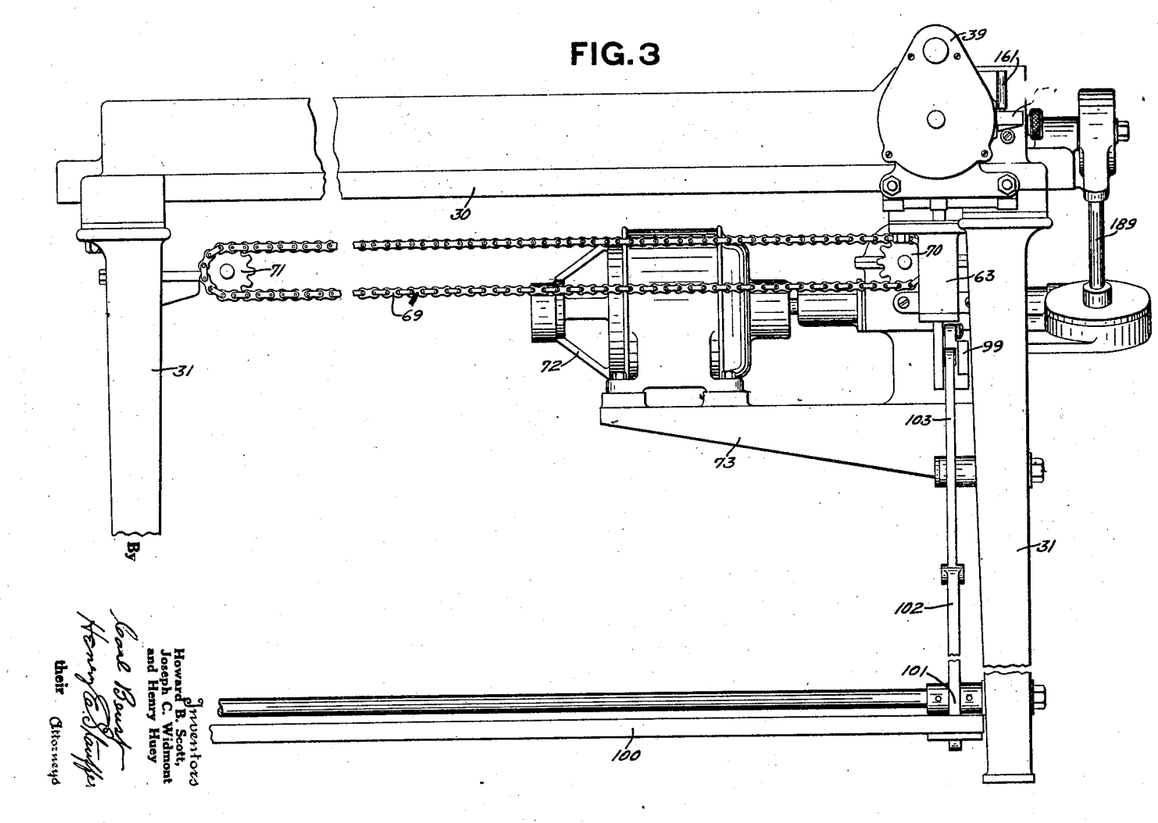
Fig. 3 is a side view of the machine.

The mechanism is supported by a table comprising a bed 30 supported at either end by supporting members 31 (Figs. 2 and 3). An etched master plate 32 is placed on the bed 30, and is secured thereto by any suitable means.

A spreader 33 and a striker 34 are carried by a carriage which is adapted to be slid lengthwise of the table in a groove 36 beneath the bed 30, as shown in Fig. 2. The carriage comprises a member 37 which slides in the groove 36 and with which a pair of arms 38 are integrally formed. The left-hand one of the arms 38, as viewed in Fig. 2, supports a housing 39, while the right-hand one of the arms 38 supports a housing 40, the purposes of which will be later described. Supported by the housings 39 and 40 is a shaft 41 which carries the spreader and striker, as shown in detail in Fig. 13. The spreader 33, which is made of leather or any other suitable material, is held by clamps 42, and is supported at each end by an upwardly extending screw 43. The screw 43 extends into a sleeve 44 which is mounted in an arm 45, one near either end of the shaft 41. Secured to the sleeve 44, at its upper end, is a knurled nut 46 for the purpose of turning the sleeve 44. It is apparent that if this sleeve is rotated, the screw 43 will be moved up or down, thereby permitting a very close adjustment of the spreader 33 to compensate for wear.

Figure 13:
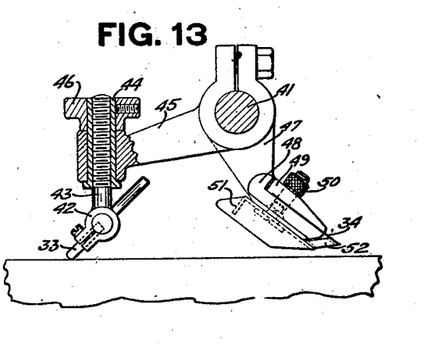
Fig. 13 is a detail view, partly in section, of the spreader and the striker and shows the manner in which these parts are attached to the carriage.

The striker 34 is carried by three arms 47 which are secured to the shaft 41 by suitable clamps, and which at their lower ends are made integral with a casting 48. This casting is cut away as shown in Fig. 13 to receive the striker blade 34, which is made of spring steel or any other suitable material. The striker blade is laid on the casting 48 and a supporting member 49 is placed over it, and both the striker and the supporting member are secured to the casting by a plurality of small screws 50. Also secured to the casting 48 is a plate 51 which has its ends bent at right angles to its main portion, and which is adapted to wipe the edges of the master plate where there is no etching when the machine is operated. At each end of the plate 51 is a small angle plate 52 which extends between the plate 51 and the rear face of the striker plate in order to stiffen the striker.

Figure 1:
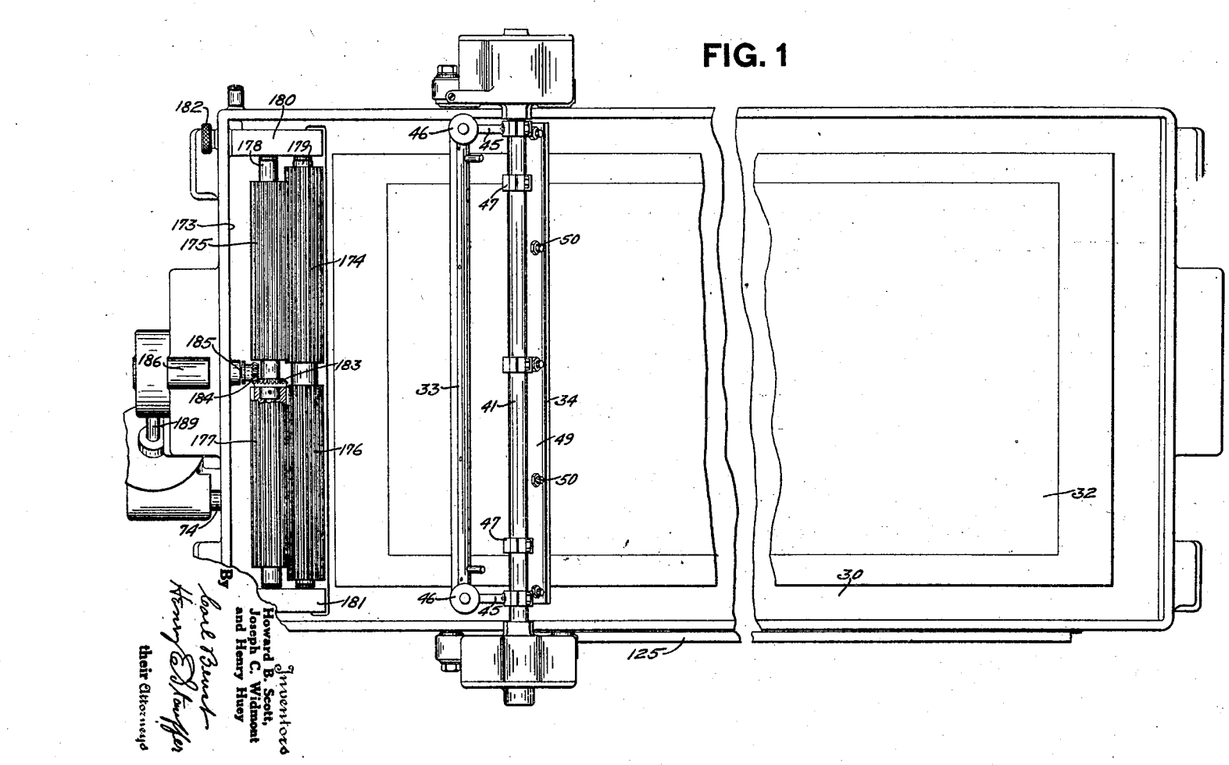
Fig. 1 is a top plan view of the complete machine.
Figure 9:
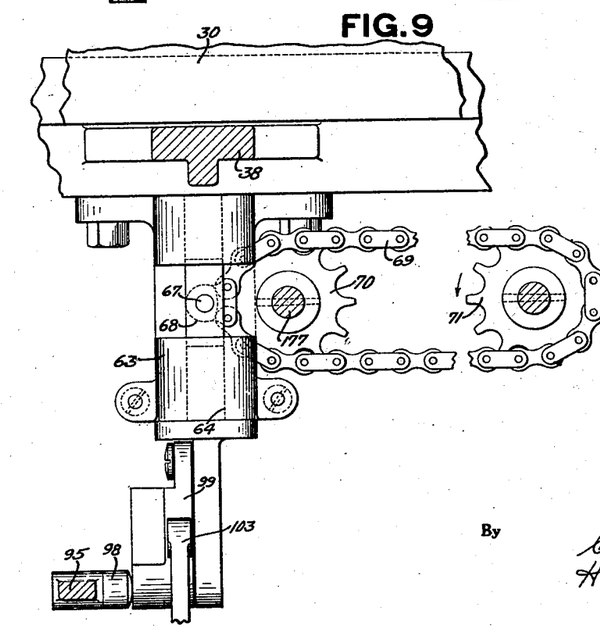
Fig. 9 is a detail side elevation of portions of the driving and clutch mechanisms.

The carriage is connected to a driving chain in the following manner. The carriage carries a downwardly extending member 63 (Figs. 3, 4 and 9) which is formed with a rectangular opening 64 in its interior. In this opening are two members 65 and 66 which are supported by a rod 67 carried by a projecting portion 68 of one of the links of a driving chain 69. This chain passes over a sprocket 70 and a sprocket 71, one at each end of the machine. The parts are in their normal positions as shown in Fig. 9, and the left-hand sprocket is driven in a counter-clockwise direction. Therefore it is evident that as the sprocket rotates, the rod 67 will be lowered, and this will bring the members 65 and 66 into the lower portion of the opening 64 in member 63. The rod 67 will then be on the lower portion of the chain, and as the movement continues, the carriage will be moved toward the right as viewed in Fig. 9, and also in Fig. 1; but toward the left as viewed in Fig. 3. When the rod 67 reaches the right-hand sprocket 71, the rod will move upward and will disengage the members 65 and 66 from the lower portion of the opening 64, and engage them with the upper portion of this opening and therefore the carriage will be carried to the left to its normal position, whereupon the members 65 and 66 will be withdrawn from the upper portion of the opening 64 and left in the position shown in Fig. 9. It is evident from the above that the carriage will be given one complete reciprocation, that is, it will move from the position shown in Fig. 3 toward the left the full length of the table, and then toward the right to its normal position.

Driving mechanism.

The chain 69 is driven, through a suitable clutch mechanism which will be hereinafter described, by means of a motor 72, which may be of any suitable type. The motor 72 is mounted on a projecting portion 73 of the table. The armature of the motor 72 is connected through a clutch (not shown) to a shaft 74 (Fig. 4) which carries a worm 75 (Fig. 6) cooperating with a worm wheel 76 loosely mounted on a shaft 77 supported by the frame work of the table. The shaft 77 supports the left-hand one of the sprockets 70 and 71 which drive the chain.

Integral with the worm wheel 76 is a clutch member 78 which is adapted to cooperate with a slidable clutch member 79, keyed to the shaft 77. The clutch member 79 has a groove 80 formed therein with which a forked member 81, carrying a pair of rollers 82, cooperates. The motor 72 is adapted to run continuously, while the machine is likely to be used, and this through the worm 75 and worm wheel 76, will drive the clutch member 78 continuously. When it is desired to connect the chain to the motor, the forked member 81 is rocked counter-clockwise, as viewed in Fig. 4, by mechanism which will be presently described, and this will engage the clutch members 78 and 79 by sliding the member 79 on the shaft 77. The clutch member 79 will therefore be rotated by the clutch member 78 and, as the member 79 is keyed to the shaft 77, this shaft and the sprocket wheel 70 will be driven.

The mechanism for engaging the clutch will now be described. This mechanism is best shown in Figs. 2, 3, 4, 5 and 9. The forked member 81 is fast on a shaft 93 which is supported by the machine frame, and this shaft also carries fast thereto an arm 94 connected by a slot-and-pin connection to one arm of a lever 95 also pivoted to the machine frame. The lever 95 constantly tends to rock in a clockwise direction as viewed in Figs. 4 and 5, and by means of a spring 96 which is stretched between an upwardly extending portion 97 of the lever 95 and any suitable point on the mechanism. The clockwise movement of the lever 95 is, however, normally prevented by the engagement of a portion 98 on the left-hand arm of the lever 95 with a pivoted member 99, which normally lies in its path. It is apparent that if the member 99, which is pivoted to the carriage of the machine, is rocked out of engagement with the projection 98, either one way or the other, the lever 95 will be rocked clockwise by the spring 96. This movement of the lever 95 will rock the arm 94 and forked member 81 counter-clockwise, as viewed in Fig. 4, which will engage the clutch member 79 with the clutch member 78 and cause the carriage to be moved.

As the operators of this machine may work on either side, and as they are usually carrying heavy rollers when they remove the grain from the master plate, means is provided for operating the clutch by a treadle, which the operator may trip with his foot. When so tripped the machine will thereby operate immediately, and the master plate will be filled and wiped preparatory to the next graining operation.

Figures 4, 5, 6:
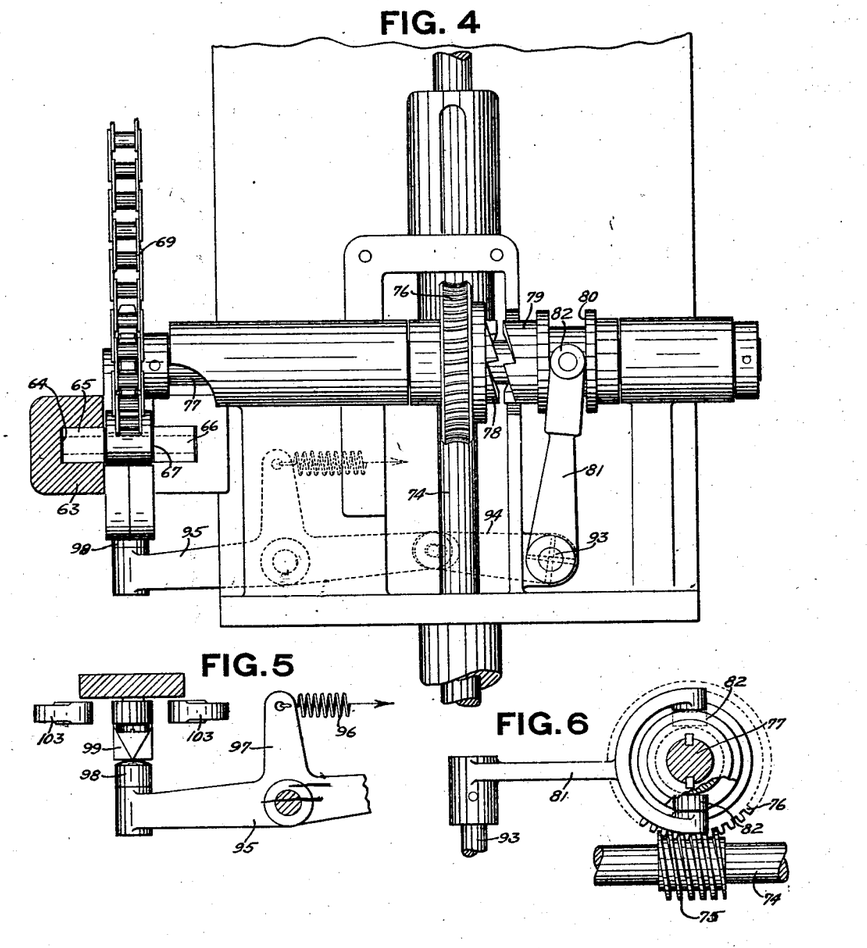
Fig. 4 is a detail view showing the carriage drive, together with the clutch mechanism therefor.
Fig. 5 is a detail top view of a portion of the releasing mechanism.
Fig. 6 is a detail side view of a portion of the clutch mechanism.

On each side of the table, and running the full length thereof, near the floor, is a treadle 100. Each treadle is supported by a pair of arms 101, one at each end of the machine. The arms 101 are fast on a shaft which is supported by the end frames. Secured to each of the arms 101 is an upwardly extending member 102 which is pivoted to the lower end of a lever 103 pivotally mounted on a cross member of the table. The members 102 are connected by means of a spring 104. The upper ends of the members 103, as best shown in Fig. 5, lie on each side of the pivoted member 99 previously mentioned, and it can therefore be seen that when the operator presses either of the treadles 100 downward, one of the arms 102 will be rocked clockwise, and this will rock the lever 103 counter-clockwise, causing the upper end of the lever to engage the pivoted member 99 and rock this member either clockwise or counterclockwise, depending on which side of the machine the operator is standing. No matter in which direction the pivoted member 99 is rocked, the lever 95 will immediately rock clockwise, as above described, and through the mechanism connected thereto cause the clutch to be engaged.

*Mechanism for adjusting the spreader and the striker.*

Figure 10:
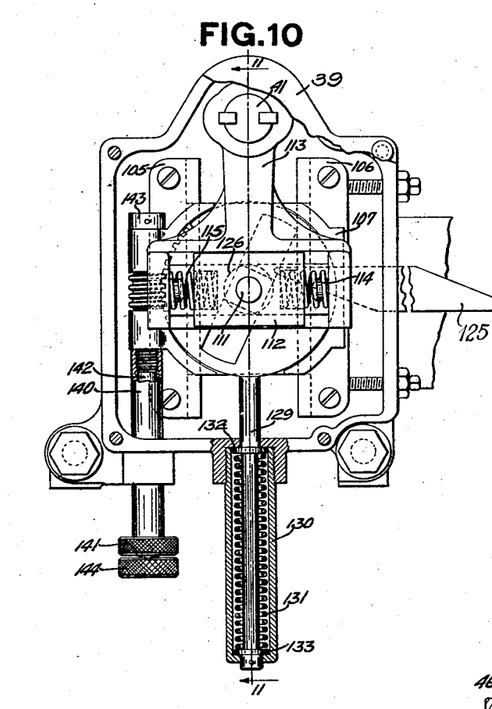
Fig. 10 is a detail side elevation of the mechanism for rocking the spreader and the striker to raise and lower them from the plate at the proper times.
Figure 11:
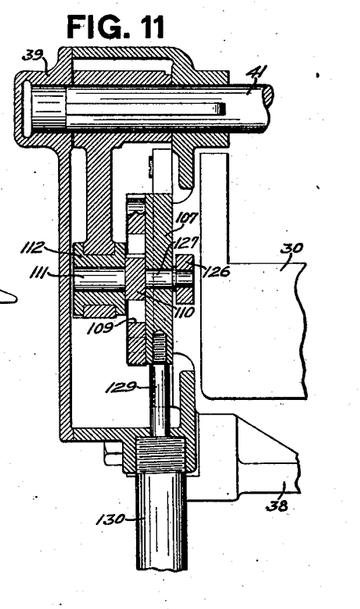
Fig. 11 is a detail sectional view taken on line 11—11 of Fig. 10.
Figure 12:
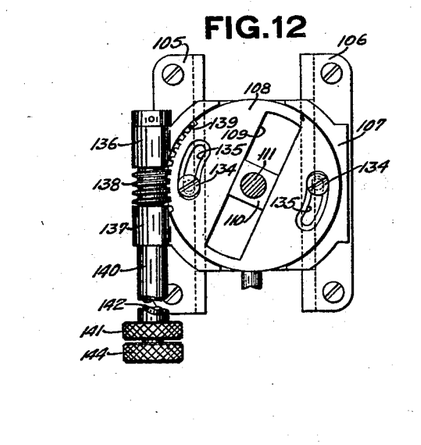
Fig. 12 is a detail view showing the means for adjusting the amount of pressure of the spreader and the striker against the plate.

Bolted to the arms 38, which support the carriage, is a housing 39 previously mentioned. Secured to the housing are two plates 105 and 106 which form a groove in which a member 107 may be moved (Figs. 10, 11 and 12). The member 107 has a recess formed therein in which is carried a circular plate 108 which has a slot 109 cut therein. Cooperating with the slot 109 is a square stud 110 which is integral with a stud 111 supported by a member 112 (Figs. 10 and 11). The member 112 is held in the center of an opening formed in a downwardly extending member 113 which is keyed to the shaft 41. The member 112 is kept near the approximate center of the opening 113 by a pair of springs 114 and 115 which extend into recesses formed in the member 112 and which are supported at their opposite ends by lugs projecting from the sides of the opening in the member 113.

Secured to the side of the table is a rail 125 (Figs. 1 and 10) which is adapted to cooperate with a roller 126 carried by a stud 127 supported by the member 107. The left-hand end of the rail 125 is beveled, as shown in Fig. 10, and when the carriage starts toward the right, as viewed in this figure, it is evident that the roller 126 will strike the beveled portion of the rail 125 and the plate 107 will be moved downwardly in the groove formed by the plates 105 and 106. The downward movement of the plate 107 will carry the circular plate 108 with it and, due to the engagement of the square stud 110 with the slot in the plate 108, the stud 110 and stud 111 will be moved toward the right, as viewed in Figs. 10 and 12. This will cause the member 112 to move toward the right and, through the spring 114, this movement will rock the member 113 and the shaft 41 counter-clockwise a sufficient distance to bring the spreader down into cooperative relationship with the master plate. This relation of the parts will continue throughout the movement of the carriage toward the right. Just as the carriage reaches its righthand position, however, the roller will pass out of engagement with the lower edge of the rail 125 and, due to a spring which will be described later, the roller will be returned to the normal position shown in Fig. 10. When the left-hand movement of the carriage commences, the roller 126 will strike the upper bevel portion of the rail 125 which will cause the plate 107 and 108 to be rocked upwardly in the grooves formed by plates 105 and 106, and therefore the square stud 110 and the member 112, will be moved toward the left, as viewed in Fig. 10, and through the spring 115 will rock the member 113 and shaft 41 in a clockwise direction far enough to remove the spreader from its cooperative relation with the master plate, and, at the same time, move the striker into cooperative relation therewith.

An arrangement is provided for returning the member 112 and the shaft 41 to their normal positions as shown in Fig. 10, at the end of each stroke of the carriage. Projecting downwardly from the plate 107 is a rod 129 (Figs. 10 and 11) which extends into a cylindrical member 130, and which is surrounded by a coil spring 131 contained within the cylindrical member. Member 130 is screwed into a projecting portion of the casing 39. The rod 129 has a collar 132, with which the upper end of the spring 131 contacts. The lower end of the spring contacts with a collar 133, at the lower end of the rod 129, the collar being just inside of the cylindrical member 130. It is evident that when the plate 107 moves downwardly as above described, at the beginning of the operation of the machine, the collar 132 on the rod 129 will compress the spring 141, and when the plate 107 returns to normal at the end of the first stroke of the carriage, the spring 131 will assist this movement. When the plate 107 moves upwardly during the return stroke of the carriage, the collar 133 will move upward in the member 130 and compress the spring 131, so that when the plate 107 returns to normal at the end of the return stroke of the carriage, it will be assisted by the spring 131.

*Means for adjusting the tension of spreader and striker.*

A mechanism is provided which will adjust the tension with which the spreader and the striker are held in contact with the master plate. This mechanism is best shown in Figs. 10 and 12. The member 107 carries two screws 134 which project through concentric slots 135 in the circular plate 107.

The member 107 has two cylindrical portions 136 and 137, formed integral therewith and between these portions is a worm 138 which is adapted to cooperate with teeth 139 formed in the periphery of the circular plate 108. The worm 138 is made integral with the tube 140 which has a knurled knob 141 on its lower end. It is apparent that when a change in the adjustment of the spreader and striker is desired, if the screws 134 are loosened and the knurled knob 141 is rotated, the circular plate 108 will be rotated either clockwise or counter-clockwise. If the plate is rotated in a clockwise direction, the angle of the slot 109 will be increased from the perpendicular, and therefore when the machine is operated, the shaft 141 will be rocked to a greater extent. If the plate 108 is rocked counter-clockwise, the angle of the slot 109 will be lessened and the shaft 141 will be rocked to a less extent, thereby reducing the pressure exerted by this shaft on the spreader and the striker. Means is provided for locking this adjustable mechanism in its set position. The tube 140 is threaded on its interior periphery, and cooperating with these threads formed on a shaft 142. The shaft 142 runs through the tube 140, and at the upper end thereof carries a collar 143 which lies just above the upper cylindrical portion 136 of member 107. At its lower end the shaft 142 carries a knurled knob 144. It can be seen from Fig. 10 that if the knob 141 is held stationary, and the knob 144 turned counter-clockwise, the threaded portion of the shaft will cooperate with the threads on the tube 140 and will draw the collar 143 downward into contact with the cylindrical portion 136. This movement can be continued until the parts are securely fastened.

*Mechanism for moving the striker and spreader carrying shaft laterally.*

Figure 7:
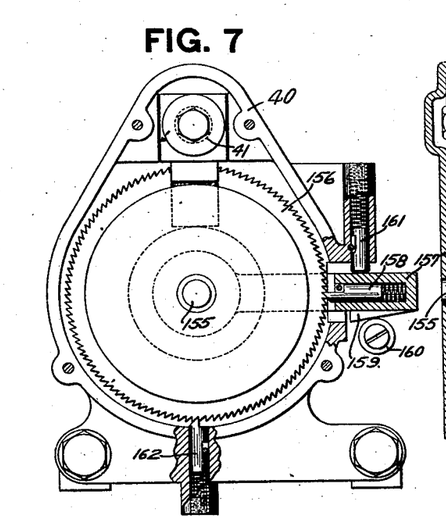
Fig. 7 is a side elevation of the mechanism for moving the carriage a short distance in a lateral direction upon each operation of the machine.
Figure 8:
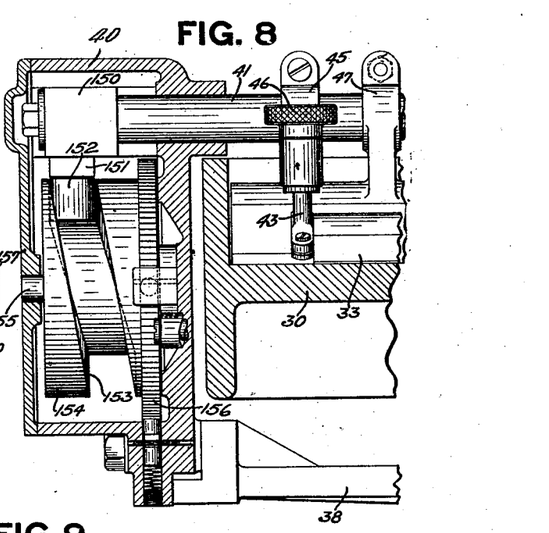
Fig. 8 is an end view of the mechanism shown in Fig. 7, and also shows a portion of the carriage.

Means is provided herein for moving the shaft 41, which carries the striker and spreader, laterally, a short distance on each operation of the machine, in order to equalize the wear both upon the striker and spreader, and on the master plate, and this mechanism will now be described. The mechanism is contained in the housing 40, which is on the right-hand side of the machine as viewed in Fig. 2. The shaft 41 at its left-hand end (Fig. 8) has a square member loose thereon, and this square member is adapted to lie in a squared portion of the casing 40. The squared member 150 of the shaft has a downwardly extending boss 151 which carries a roller 152 extending into a cam groove 153, formed in the periphery of a cam 154 which is supported by studs 155 journalled in the casing 40. Integral with the cam 154 is a ratchet gear 156 (Fig. 7). Loosely mounted on one of the studs 155 is an arm 157, the end of which has a hollow portion carrying a spring-pressed plunger 158, which is formed at its left-hand end to cooperate with the teeth of the ratchet 156. The arm 157 has a beveled portion 159, which in the normal position of the machine rests on a roller 160 mounted on a stud projecting from the side frame of the machine.

When the carriage starts its movement, which is toward the left, as viewed in Fig. 7, the arm 157 will pass away from the roller 160, and the arm will then be rocked clockwise, due to the action of a spring-pressed plunger 161 supported in a suitable opening in the casing 40. The clockwise movement of the arm 157 will cause the plunger 158 to engage the next tooth in a clockwise direction on the ratchet. The parts will remain in this position until the carriage returns to its normal position, whereupon the beveled portion 159 will come in contact with the roller 160 and will cam the arm 157 counter-clockwise about its pivot. This will rotate the ratchet wheel one tooth in a counter-clockwise direction, and as the cam 154 is integral with the ratchet, the cam will also be moved to a corresponding extent. The cam groove 153 is so formed that each movement of the ratchet will cause the shaft 41 to be moved a short distance either toward the left or toward the right, depending upon the position of the roller 152 in the cam grooves. It can therefore be seen that during a plurality of operations of the machine, the shaft 41 will move slowly towards the left a certain number of steps, whereupon the direction of the cam will be reversed and the shaft will commence moving step by step towards the right or vice versa. Clockwise movement of the ratchet 156 is prevented by means of a spring-pressed pawl 162 which is carried in an opening in the casing 40 and contacts with the teeth of the ratchet.

*Agitating mechanism for the graining paste or pigment.*

A mechanism is provided for constantly agitating the graining paste or pigment so that it will not settle should the machine stand idle for any length of time. This is accomplished in the following manner. The graining paste is contained in a trough 173 (Fig. 1), and this trough is kept filled. In the trough are four broad gears 174, 175, 176 and 177. These gears are fast on shafts 178 and 179 which are supported by blocks 180 and 181 fastened to the bed of the machine. When it is desired to clean the trough and the gears, all that is necessary is to unscrew two knurled nuts 182, which fasten the blocks 180 and 181 to the bed of the machine, and the shafts 178 and 179, together with the gears, can be lifted out as a unit.

The gears are driven in the following manner. The gear 177 has a beveled pinion 183 secured to its left-hand end as viewed in Fig. 1. Meshing with this beveled pinion is a beveled pinion 184 fast on a shaft 185 supported in a suitable bearing 186. This shaft extends through the end wall of the bed 30 and, at its outer end, carries a beveled gear 187 which meshes with a beveled pinion 188 fast on a shaft 189 which is supported by bearings 190 and 191 bolted to the machine frame. At its lower end the shaft 189 carries a worm wheel 192 which cooperates with a worm 193 fast on the end of the shaft 74 (Fig. 4). The shaft 74 is constantly driven by the motor, and therefore, through the train of gears above described, will drive the broad gear 177 in the paste trough. The gear 175 is fast on the shaft 178 which is driven as above described, and this gear meshes with the gear 174 and will therefore drive it. The gear 176 meshes with the gear 177 and is driven thereby. It is evident that the constant agitation caused by the movement of these gears in the trough will keep the graining paste well mixed, and prevent any settling in the trough. The pairs of gears 176 and 177 and 174 and 175 rotate towards each other as viewed in Fig. 1, and the graining paste will pile up between them to a level above that of the table. The spreader is raised when moved towards the left and is lowered after it has passed the pairs of gears. Then, when it starts to the right again, the spreader will accumulate in front of it the paste which is piled up between the pairs of gears above the level of the plate.

While the form of mechanism herein shown and described is admirably adapted to fulfill the objects primarily stated, it is to be understood that it is not intended to confine the invention to the one form of embodiment herein disclosed, for it is susceptible of embodiment in various forms, all coming within the scope of the claims which follow:

1. In a machine of the class described, the combination of an etched or engraved plate, a table supporting said plate, a pigment receptacle at one end of said table, a carriage supporting a pigment spreader and a striker operative at different times during an operation of the machine, and means for constantly agitating the supply of pigment in said receptacle.

2. In a machine of the class described, the combination of a plate, a carriage adapted to move forward and backward over said plate, a spreader and a striker carried by said carriage and both normally out of cooperative relation with said plate, and means for automatically moving first said spreader and then said striker into cooperative relation with said plate.

3. In a machine of the class described, the combination of a graining plate, a spreader and striker therefor, a shaft for carrying both the spreader and the striker, an arm secured to said shaft, a roller carried by said arm, and a rail having beveled ends adapted to cooperate with said roller to move first the said spreader and then the said striker into contact with said plate.

4. In a machine of the class described, the combination of a graining plate, a spreader and striker therefor, a shaft for carrying both the spreader and the striker, an arm secured to said shaft, a roller carried by said arm, a rail having beveled ends adapted to cooperate with said roller to move first the said spreader and then the said striker into contact with said plate, and means for regulating the pressure of said spreader and striker against said plate.

5. In a machine of the class described, the combination of a graining plate, a spreader and striker therefor, a shaft for carrying both the spreader and the striker, a member fast to said shaft, a roller carried by said member, and a cam cooperating with said roller to move said shaft a short distance in a lateral direction during each stroke of said spreader and striker.

6. In a machine of the class described, the combination of a graining plate, a spreader and striker therefor, a shaft for carrying both the spreader and the striker, a member fast to said shaft, a roller carried by said member, a cam cooperating with said roller to move said shaft a short distance in a lateral direction during each stroke of said spreader and striker, and a ratchet mechanism for rotating said cam to a predetermined extent on each operation of the machine.

In testimony whereof we affix our signatures.

HOWARD B. SCOTT.
JOSEPH C. WIDMONT.
HENRY HUEY.